(12) United States Patent
Martin et al.

(10) Patent No.: US 11,313,041 B2
(45) Date of Patent: Apr. 26, 2022

(54) MANUFACTURED METAL OBJECTS WITH HOLLOW CHANNELS AND METHOD FOR FABRICATION THEREOF

(71) Applicant: National Research Council of Canada, Ottawa (CA)

(72) Inventors: Manuel Martin, Boucherville (CA); Phuong Vo, Montreal (CA); Eric Irissou, Longueuil (CA); Jean-Gabriel Legoux, Repentigny (CA)

( * ) Notice: Subject to any disclaimer, the term of this patent is extended or adjusted under 35 U.S.C. 154(b) by 136 days.

(21) Appl. No.: 16/459,880

(22) Filed: Jul. 2, 2019

(65) Prior Publication Data

US 2020/0024746 A1     Jan. 23, 2020

Related U.S. Application Data

(60) Provisional application No. 62/699,063, filed on Jul. 17, 2018.

(51) Int. Cl.
| | |
|---|---|
| *B32B 15/01* | (2006.01) |
| *C23C 24/04* | (2006.01) |
| *B29C 64/30* | (2017.01) |
| *B05D 1/12* | (2006.01) |
| *B33Y 40/00* | (2020.01) |
| *B33Y 80/00* | (2015.01) |

(52) U.S. Cl.
CPC ............ *C23C 24/04* (2013.01); *B05D 1/12* (2013.01); *B29C 64/30* (2017.08); *B32B 15/01* (2013.01); *B32B 15/012* (2013.01); *B33Y 40/00* (2014.12); *B33Y 80/00* (2014.12); *Y10T 428/12479* (2015.01); *Y10T 428/12493* (2015.01)

(58) Field of Classification Search
None
See application file for complete search history.

(56) References Cited

U.S. PATENT DOCUMENTS

| | | |
|---|---|---|
| 5,302,414 A | 4/1994 | Alkhimov et al. |
| 5,640,767 A | 6/1997 | Jackson et al. |
| 5,658,506 A | 8/1997 | White et al. |
| 5,855,237 A | 1/1999 | Okada et al. |

(Continued)

FOREIGN PATENT DOCUMENTS

| | | |
|---|---|---|
| DE | 102007017752 A1 | 10/2008 |
| WO | 2014/116254 A1 | 7/2014 |
| WO | 2015/112583 A1 | 7/2015 |

*Primary Examiner* — Daniel J. Schleis
(74) *Attorney, Agent, or Firm* — Brunet & Co., Ltd.; Hans Koenig; Robert Brunet

(57) ABSTRACT

A method of forming a hollow structure in an additively manufactured object involves creating a pattern on a surface of a base material of the object with a sacrificial metal filler having a melting point of 350° C. or less, the pattern defining a shape of the hollow structure on the base material. A metal layering material is cold sprayed over the sacrificial metal filler and at least a portion of the base material. The sacrificial metal filler is removed from the pattern by melting the sacrificial metal filler without melting or deforming the base material or the metal layering material to leave the hollow structure in the object formed from the pattern. Non-standard cold spray conditions are used with the metal layering material to prevent damage and or displacement of the filler while still forming a coating of the metal layering material on the filler and base material.

19 Claims, 8 Drawing Sheets

(56) References Cited

U.S. PATENT DOCUMENTS

| | | | |
|---|---|---|---|
| 6,261,432 B1 | 7/2001 | Huber et al. | |
| 6,796,366 B2 | 9/2004 | Roche et al. | |
| 7,003,864 B2 | 2/2006 | Dirscherl | |
| 8,584,732 B1 | 11/2013 | Trexler et al. | |
| 8,741,420 B2 * | 6/2014 | Bunker | C23C 24/04 428/173 |
| 9,168,546 B2 | 10/2015 | Xue et al. | |
| 9,598,963 B2 * | 3/2017 | Bunker | F01D 5/186 |
| 2011/0091660 A1 | 4/2011 | Dirscherl | |
| 2011/0229595 A1 | 9/2011 | Krommer et al. | |
| 2012/0114868 A1 | 5/2012 | Bunker et al. | |
| 2012/0114912 A1 | 5/2012 | Bunker et al. | |
| 2012/0148769 A1 | 6/2012 | Bunker et al. | |
| 2012/0243995 A1 | 9/2012 | Bunker et al. | |
| 2014/0302278 A1 | 10/2014 | Bunker | |
| 2015/0246394 A1 | 9/2015 | Lancaster-Larocque et al. | |
| 2015/0321217 A1 | 11/2015 | Nardi et al. | |
| 2016/0115820 A1 | 4/2016 | Prentice et al. | |

* cited by examiner

MANUFACTURED METAL OBJECTS WITH HOLLOW CHANNELS AND METHOD FOR FABRICATION THEREOF

CROSS-REFERENCE TO RELATED APPLICATIONS

This application claims the benefit of U.S. Provisional Application U.S. Ser. No. 62/699,063 filed Jul. 17, 2018, the entire contents of which is herein incorporated by reference.

FIELD

This application relates in general to methods for additive manufacturing of metal objects with continuous hollow channels embedded therein, and to hollow metal objects produced thereby; and in particular to a cold sprayed additive manufacturing with low temperature sacrificial metal filler.

BACKGROUND

There is growing interest in using cold spray technology as a metal additive manufacturing (AM) process due to the solid-state high deposition rate of single, multi or functionally graded materials and the possibility of depositing add-ons onto existing parts of nearly unlimited size while preventing both the part and the add-ons from heat affected zone (HAZ) issues. These advantages could provide Cold Spray Additive Manufacturing (CSAM) with a potentially significant edge over other metal AM technologies. However, in contrast to other metal AM technologies such as powder bed fusion, CSAM suffers from strong limitations for directly manufacturing parts with hollow structures. The capability of metal AM technologies to produce parts of complex shape with less machining than required by conventional methods is one of the main reasons why AM technologies are highly desirable.

Different methods to enable the use of CSAM for parts or add-ons containing hollow structures have been proposed. However, to date the drawbacks of such methods limit the number of commercial applications that can be addressed with cold spray. With cold spray, two different approaches have been recently explored to produce hollow structures: a) a cold spray building strategy based on the use of sacrificial filler; b) advanced cold spray strategies without any filler.

In the first approach, the space for a hollow structure (e.g. a cavity or an internal channel) is temporarily filled with a filler material, which is used to support cold spraying of all or some of the external envelope of the hollow structure. The filler material is removed after deposition of the external envelope to leave the hollow structure bounded by the envelope. The concept of sacrificial filler has been used in lost core molding and casting, for example. However, the specific challenges related to this approach with cold spray mostly arise from the problem of using a filler material that can sustain cold spray conditions (thermal and mechanical resistance) and can still be removed without damaging the part. Existing cold spray process for the manufacture of hollow structures (e.g. cavities and internal channels) using sacrificial filler are limited to the use of relatively hard filler materials to sustain the cold spray process. Forming of the filler into a given shape can therefore be difficult. Also, removing the sacrificial filler can be time consuming and environmentally unfriendly when chemical etching is used or can damage the part if the filler is melted out at too high of a temperature. If the core is machined out, an important advantage of CSAM (requiring less machining) may be reduced.

In the second approach, hollow structures are produced without using a filler material. In one example, cold spray is carried out in a succession of layers at different angles to progressively bridge a gap between sides of a groove, finally closing the groove to form the hollow structure. In another example, a coating is applied on at least one side of a groove and is then plastically deformed to close the groove to form the hollow structure. The use of multiple spray angles results in poorly closed hollow structures, and poor control on the final shape of the hollow structure. Plastically deforming a coating to close a groove requires some ductility; however, cold sprayed materials in as-sprayed conditions mostly lose ductility, making the resulting coatings poorly deformable. The second approach may be limited to producing small diameter channels.

There remains a need for a cold spray process for forming hollow structures in a metal object, which provides good dimensional control of the hollow structure while reducing damage to the object that may arise from cold spraying.

SUMMARY

It has now been found that certain cold spray conditions can coat a low melting point filler with a higher melting point metal without damaging the filler during cold spray deposition, permitting the melt removal of the low melting temperature filler without affecting the metal object. Thus, hollow structures can be formed in the metal object by cold spray technology without dissolution chemicals, machining, or high temperature treatment that affects the metals. In particular, cold sprayed metals that are minimally heat affected or aged and have no phase transitions or unwanted microstructure changes at temperatures below 500° C., more preferably below 400° C., more preferably below 375° C., for a duration of a melt removal process (less than 6 h, more preferably less than 3 h, or less than 1 h), are commonly available. The low melting point sacrificial metal filler facilitates both insertion and removal of the filler during fabrication of the object in comparison to the use of other fillers known in the art.

In one aspect, there is provided a method of forming a hollow structure in an additively manufactured object, the method comprising: creating a pattern on a surface of a base material of the object with a sacrificial metal filler having a melting point of 350° C. or less, the pattern defining a shape of the hollow structure on the base material; cold spraying a metal layering material over at least portion of the sacrificial metal filler and at least a portion of the base material, the metal layering material having a melting point higher than 350° C.; and, removing the sacrificial metal filler from the pattern by melting the sacrificial metal filler without melting or deforming the base material or the metal layering material, to leave the hollow structure formed in the object from the pattern.

Herein the term 'object' refers to any material body, but is preferably a machine, such as a vehicle, or a forming apparatus, particularly including a part or piece of such a machine, such as a motor vehicle part, or a tool or die for forming such a machine part.

Herein the term 'hollow structure' refers to one or more of: a channel, of constant or variable channel dimensions; a join of two or more channels; and a cavity, where each channel, join, and cavity is in fluid connection with one, or more preferably, two or more openings in the additively manufactured object. Each of the openings may be on a top surface of the part (where the cold sprayed metal layering material is not applied), at an interface between the base material and the sacrificial metal that is not covered by the metal layering material, or at an opening in the base material through which the molten filler may drain to an interior cavity of, or to a port of, the base material. The hollow structure is particularly noted as useful for forced air or fluid temperature control or regulation (cooling or heating) of machine parts but can also or alternatively be used to embed sensors or actuators of control systems into metal parts or objects.

Herein the term 'metal' includes all mixtures of metals, including alloys. The term metal does not imply purity beyond the requirements for functionality, and impurities. For example, the filler material may contain up to 30 wt. % of non-metallic elements, such as ceramics or glasses up to 25 wt. %, or more preferably 0-15 wt. %, or an amount of ceramic material that increases thermal and or mechanical resistance of the filler without impairing melt removal. The metal layering material may comprise up to 5 wt. % of ceramic, and any dense overcoat may have up to 40 wt. % ceramic.

In another aspect, there is provided an additively manufactured object comprising: a base material; a hollow structure embedded on the base material and bounded in part by the base material; and, a cold sprayed layer of a metal layering material coating a portion of the base material, the metal layering material bounding a portion of the hollow structure, the metal layering material having a higher porosity than the base material, a lower hardness than the base material, a lower degree of plastic deformation than the base material or any combination thereof. Over the metal layering material, a dense cold sprayed overcoat layer may be applied, the dense cold sprayed overcoat layer may have a porosity intermediate that of the base material and the metal layering material.

In another aspect, there is provided a composition comprising a metal base material, a fusible metal having a melting point of 350° C. or less arranged on the base material in a shape and a cold sprayed layer of metal layering material covering the fusible metal, the cold sprayed metal layering material having a microstructure consistent with cold spray deposition conducted under non-standard lower pressure cold spray conditions in comparison to standard cold spray conditions for depositing the metal layering material on the metal base material.

The present cold spray process for forming hollow structures in a metal object provides one or more of good dimensional control of the hollow structure and reduction or elimination of damage to the object arising from the cold spraying. Further, more complex hollow structures may be formed into the metal object.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
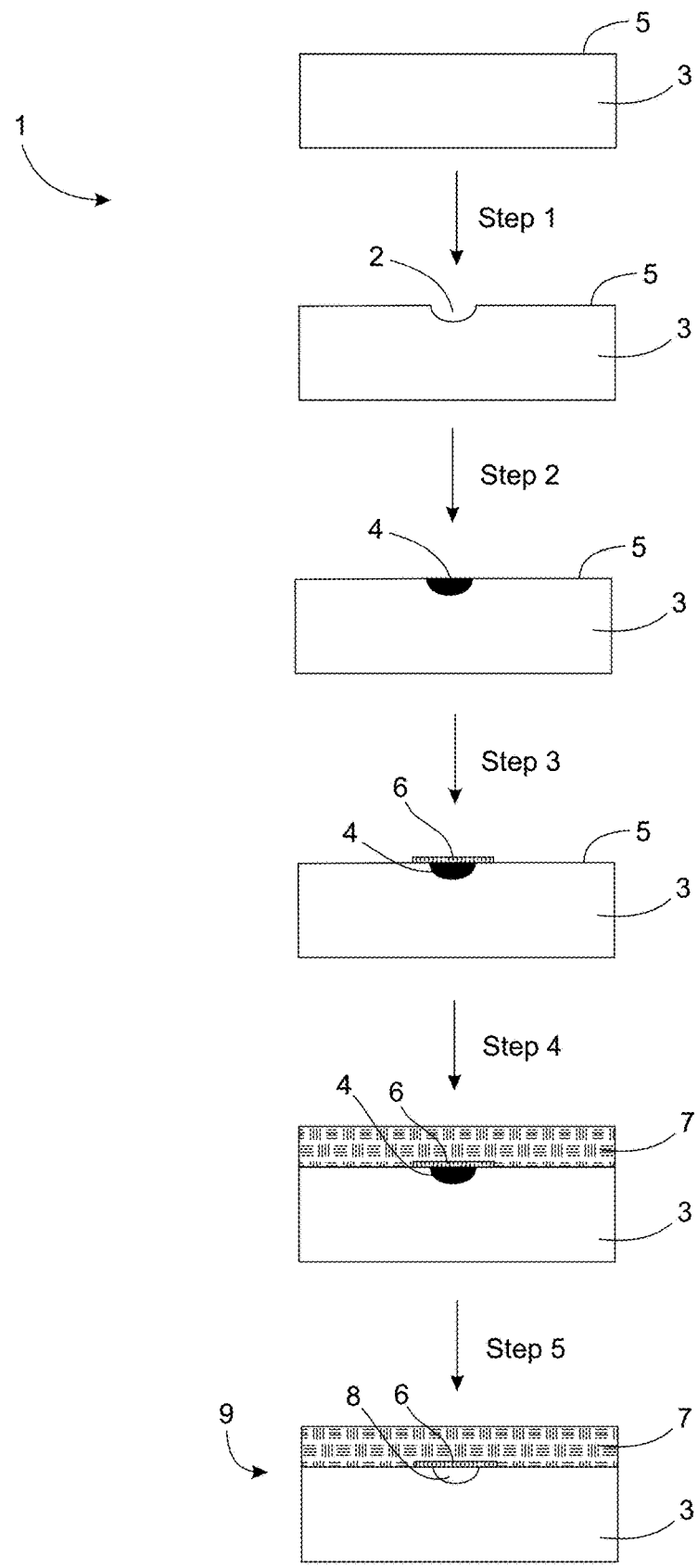
FIG. 1 is a schematic diagram illustrating a first embodiment of an additive manufacturing process of the present invention for forming a channel in a metal object.

A method of forming a hollow structure in an additively manufactured object may comprise arranging a fusible sacrificial metal space-filling material on a surface of a base material (be it a structured part, a sheet, an additively manufactured workpiece or a substrate of any form bearing the surface), in a pattern that will ultimately be a hollow structure of the object. The pattern is created with a low melting point sacrificial metal filler that supports cold spray deposition of a metal layering material under low-impact cold spray conditions. The metal layering material is applied by cold spraying the metal layering material over at least a portion of the base material and at least a portion of the sacrificial metal filler. In some embodiments, the metal layering material is applied over at least all of the sacrificial metal filler that is away from the openings of the hollow structure, including at an interface between the base material and the sacrificial metal filler. In some embodiments, the metal layering material is applied over all or most of the sacrificial metal filler, for example over more than 50% of the exposed surface of the sacrificial metal filler, or over more than 80% or more than 90% of the exposed surface area of the sacrificial metal filler.

The metal layering material may be deposited as a simple coating or a complex shape. After deposition, the sacrificial metal filler is removed from the hollow pattern by heating the sacrificial metal filler to a temperature above the melting point of the filler but below a temperature that would cause damage to the base material or metal layering material. Molten filler may flow out of the hollow structure, for example through one or more openings, under the influence of gravity and/or negative pressure. If there are a plurality of openings, differential applied pressure at the plurality of interconnected ports may assist in removal of the molten filler. In some embodiments, a dense metal overcoat layer is cold sprayed over top of the metal layering material prior to or after removal of the sacrificial metal filler, preferably prior to removal of the sacrificial metal filler. An advantage of applying the dense metal overcoat prior to removal of the sacrificial metal is that reduced thickness of the metal layering material deposited at low pressure is possible, because the filler remains intact to increase support of the metal layering material during the deposit of the dense metal overcoat.

Cold spraying of the metal layering material on top of a low melting point malleable sacrificial metal filler has been accomplished with non-standard cold spray conditions, but these non-standard cold spray conditions may not be required or may be relaxed in some circumstances especially if higher cold spray resistance low melting point sacrificial metal filler materials are developed. Standard cold spray parameters result in high particle and gas speed at impact with the filler material, as well as a relatively high temperature, which risks damage and/or displacement (e.g. erosion and/or melting) of the sacrificial metal filler. Therefore, cold spray conditions were adjusted away from the standard cold spray conditions that are normally used for the particular base material and metal layering material, to lower cold spray particle speed and/or temperature at impact. This allowed coating of the metal layering material on the sacrificial metal filler and base material without damage to or displacement of the sacrificial metal filler. Standard cold spray conditions for coating the metal layering material on the base material are dependent on the nature of the metal layering material and the base material. Cold spray conditions that may be adjusted include, for example, reduced inlet carrier gas pressure, reduced inlet carrier gas temperature, increased distance between nozzle outlet and a surface of the sacrificial metal filler (i.e. standoff distance), increased feedstock particle size or less spherical morphology (more rod-like, or plate like, or agglomerated and sintered spherical morphology, for example), carrier gas (for example, replacing a nitrogen fraction with helium may reduce temperature of gas and/or particles, ceteris paribus), transverse (scanning) speed and substrate cooling or any combination thereof may achieve a sufficiently low cold spray particle and gas speed and/or temperature at impact to permit coating of the metal layering material on the base material without damaging or displacing the sacrificial metal filler. If the cold spray particle speed and/or temperature at impact are too low, the metal layering material will fail to adhere to the base material. If the cold spray particle speed and/or temperature at impact are too high, then the sacrificial metal filler will be damaged or displaced adversely affecting dimensional control of the hollow structure and/or damaging the part. Thus, non-standard cold spray conditions that are less harsh than standard cold spray conditions, are referred to herein as low-impact cold spray conditions.

Changes in conditions that have been found to facilitate coating of aluminum, copper or steel metal layering materials on base materials without damaging the sacrificial metal filler consisting of lead or tin are: inlet gas pressure adjusted from the standard 2-5 MPa to 1 MPa or lower, preferably 0.55-1 MPa; inlet gas temperature adjusted from the standard in a range of 300-1000° C. (depending on the metal layering material) to 300° C. or less, preferably 200-300° C. Standoff distance may be adjusted from the standard 20-50 mm to greater than 50 mm, more preferably 60 mm or greater, for example 60-100 mm.

The base material may be a metal. In one embodiment, the base material may be an existing metallic part of an object. In another embodiment, the base material may be a metallic part formed by deposition, for example cold spraying, of a metal on a pre-existing part, the pre-existing part acting as a substrate for the base material deposited thereon. In one embodiment, the pattern for receiving the sacrificial metal filler may be formed into the base material as a subsurface template, for example by machining, or formed during deposition of the base material on a substrate. A combination of machining and base material deposition may be used to form the pattern.

An advantage of some fusible low melting point materials as the sacrificial metal filler is their ductility. Lead, for example, can be formed by hand, allowing for manual or low-pressure application processes. One particular part of the pattern to pay attention to is the edge where the pattern will meet the base material. It may be easier to form rounded lead tubular forms (such as wires and rods) which are preferable only if the base material offers a groove of cooperating dimensions, otherwise a gap that is difficult to fill with cold spray deposition may be provided. While this may be advantageous for increasing a volume of the channel structure if suitably predictable, if the space allows deformation of the tubular form during cold spray, it may reduce cold spray deposition efficiency and channel dimension control. The application of suitable pressure or the flattening of the tubular shape have been found to provide suitable edge interfaces.

The pattern occupies at least a portion of the space for the hollow structure being formed in the object. In some embodiments, the pattern is formed as a subsurface cavity or internal channel in the base material, which gives rise to channel-shaped voids or "tunnels" in the object. In one embodiment, the pattern may be in the shape of a bottom surface of a channel-shaped void to be formed in the object. The pattern should be designed to permit evacuation of the sacrificial metal filler from the hollow structure in the object once the object has been formed. Evacuation of the sacrificial metal filler may be accomplished via an opening in the hollow structure arising from the pattern design, or from exit channels machined into the object before or after cold spraying of the metal layering material. The base material preferably comprises aluminum, an alloy of aluminum (e.g. Al6061), titanium, an alloy of titanium, copper, an alloy of copper, nickel, an alloy of nickel, steel (e.g. mild steel) and the like. The base material may alternatively be composed of a ceramic, a metal matrix composite, or a polymer or polymer composite with a thermal protective layer able to withstand cold spray, at least with the low-impact cold spray conditions.

The sacrificial metal filler temporarily fills the pattern formed in the base material and supports cold spraying of the metal layering material prior to removal of the filler. The melting point of the sacrificial metal filler is 350° C. or less, preferably in a range of from 170° C. to 330° C. The sacrificial metal filler preferably has a tensile strength in a range of from 15 MPa to 250 MPa. The sacrificial metal filler preferably has a Modulus of elasticity in a range of from 10 GPa to 50 GPa. The sacrificial metal filler preferably has a Brinell hardness in a range of from 2 to 4.5. The sacrificial metal filler preferably comprises lead, a lead alloy, tin, a tin alloy, lead-free pewter alloy or other fusible metal alloys with the aforementioned properties. The ideal sacrificial metal filler would have the lowest melting point, the most malleability and ductility for ease of forming into the pattern, and the greatest cold spray deposition efficiency with least, or best controlled, deformation. To fill the pattern in the surface of the base material with the sacrificial metal filler, the filler may be machined, heated and/or otherwise formed in the pattern, or additively manufactured using metal powder-bed fusion, direct energy deposition or the like. To form the filler into the desired pattern, the filler may be hammered, glued (with epoxy for example), welded, brazed or the like. The sacrificial metal filler may be machined to desired dimensions and/or roughness after being applied to the surface. The sacrificial metal filler pattern may include one or more simple tubulars, joins of two or more tubulars, or a network of higher diameter arteries that divide regularly as a delta to form finer and finer capillaries, such as is useful for high uniformity temperature control.

The metal layering material is selected for compatibility with the sacrificial metal filler and the base material. The metal layering material is selected in combination with cold spray conditions to permit cold spraying of the metal layering material on top of the sacrificial metal filler without damaging or displacing the sacrificial metal filler in the pattern. Preferably, the metal layering material is a highly deformable, low yield strength metal, which can be cold sprayed at reduced inlet gas temperature. Some examples of metals useful as the metal layering material are copper, aluminum, steel (e.g. tool steel) and the like. Metal layering material is cold sprayed in powder form. The metal layering material may be further modified to reduce damage to the sacrificial metal filler during cold spraying of the metal layering material. For example, the metal layering material may be modified to increase deformability of the sprayed particles in comparison to spherical particles of the metal layering material. Increasing deformability of the metal layering material, for example by using dendritic or agglomerated feedstocks, porous powdered feedstocks and/or heat treating the metal layering material to produce a feedstock with lower hardness (such as is taught in Applicant's co-pending application WO 2019/016779, the entire contents of which is herein incorporated by reference), helps reduce damage to the sacrificial metal filler during cold spraying. It is a surprising result that hard tool steel, even softened by this treatment method, can be cold sprayed onto low melting point fusible metal using low-impact cold spray conditions. In one embodiment, the metal layering material is further modified by agglomeration to increase deformability of the metal layering material. The metal layering material should be cold sprayed to form a coating that at least completely cover the sacrificial metal filler at a region where the hollow structure is to be formed in the object, and may expressly exclude one or more openings of the hollow structure. The metal layering material also partly covers, and may fully cover, the base material. If the base material is subject to damage by regular cold spray deposition, the base material is preferably fully covered (as much as is desired for the final part). Insofar as the low-impact cold spray conditions afford a weaker bond of the added part, only the parts adjacent to the sacrificial metal filler necessary for attachment of the metal layering material may be covered. Preferably, the metal layering material covers the base material sufficiently at the interface between the base material and sacrificial metal filler to follow the contour of the pattern within 1 mm of the edge of the pattern. The coating of metal layering material preferably has a thickness in a range of 50-1000 µm, more preferably 100-500 µm. The coating of metal layering material preferably is able to sustain high impact cold spray so that a metal overcoat may be applied using standard cold spray conditions over top of the metal layering material and base material.

Low-impact cold spray conditions for applying the metal layering material over the sacrificial metal filler may not provide appropriate mechanical properties for the object. For example, the density, adhesion, hardness and/or strength of the coating of metal layering material may be unsatisfactory for the purpose for which the object is intended. If the coating on the base material must have different properties than the coating of the metal layering material, a dense metal overcoat layer may be deposited on the base material and the coating of metal layering material, for example using standard cold spray conditions. The metal overcoat layer may comprise any suitable metal that can be cold sprayed to form a dense metal layer on the base material and/or the metal layering material, including the same feedstock powder as was used for forming the metal layering material, a same alloy as that of the feedstock powder of the metal layering material, a different alloy of the same metal as the metal layering material, or a different metal. The metal overcoat layer is preferably cold sprayed in powder form. The metal overcoat layer may be cold sprayed using standard cold spray conditions because the sacrificial metal filler is protected by the metal layering material, or the metal overcoat layer may be graded with process parameters varying with each spray pass from low-impact cold spray conditions to standard cold spray conditions. Some non-limiting examples of metals useful for the metal overcoat layer include aluminum-based materials, copper-based materials, steels (e.g. stainless steels, tool steels) and titanium-based materials.

An object additively manufactured by the method of the present invention has a base material and a subsurface hollow structure embedded in the base material bounded in the object by the base material and a cold sprayed layer of a metal. The cold sprayed layer of the metal coats a portion of the base material and bounds a portion of the hollow structure. The microstructure of the cold sprayed metal layering material may be the same or different than that of the base material. In general, the metal layering material has a higher porosity than the base material or any overcoat, as well as a lower degree of plastic deformation and a lower hardness.

In some embodiments, the object has a first cold sprayed metal layering material bounding a portion of the hollow structure deposited with the low-impact cold spray conditions, and a second cold sprayed metal covering the first cold sprayed metal layer deposited with standard cold spray conditions. The first cold-sprayed metal layer is expected to have a different microstructure than the second cold sprayed metal layer, particularly in the region of the hollow structure that was created by the removal of the sacrificial metal filler during additive manufacturing. The first cold-sprayed metal layer will have, relative to the second cold-sprayed layer one or more of: a higher porosity, a lower degree of plastic deformation, and a lower hardness. Or equivalently, the second cold-sprayed metal layer may have one or more of a lower porosity than the first cold-sprayed layer, a lower degree of plastic deformation than the first cold-sprayed layer and a higher hardness than the first cold-sprayed layer.

FIG. 1 illustrates a first embodiment of an additive manufacturing process 1 for forming a channel 8 having a semi-circular cross-section in an object 9 made of metal, ceramic, or thermally protected polymer composite. In Step 1, a subsurface groove 2 is machined into a block of base material 3, for example a block of Al6061 alloy. While the groove is illustrated as a highly rounded groove, any groove profile may alternatively be used, including a substantially square, or triangular shaped groove. In Step 2, the groove 2 is filled with a fusible metal 4 having a melting point of 350° C. or less, for example lead, and the fusible metal 4 is machined to provide a top surface that is flush with a top surface 5 of the block of base material 3. Machining of the fusible metal is unnecessary if the fusible material as laid-up is sufficiently stabilized to withstand low impact cold spray conditions. In Step 3, a metal layering material 6, for example aluminum, is cold sprayed under non-standard (low-impact) cold spray conditions over top of the fusible metal 4 in the groove 2, the metal layering material 6 overlapping the top surface 5 of the block of base material 3. In Step 4, a metal overcoat 7, for example stainless steel or aluminum, is cold sprayed under standard (high-impact) cold spray conditions over top of the metal layering material 6 and over the top surface 5 of the block of base material 3. In Step 5, heat is applied to melt the fusible metal 4, which flows out under the influence of gravity or applied pressure to provide the channel 8 in the object 9. Thus, an object is produced with a hollow structure defined by the extent of the fusible metal 4, that includes at least one end defined at an interface between the base material 3 and metal layering material 6.

Figure 2A:
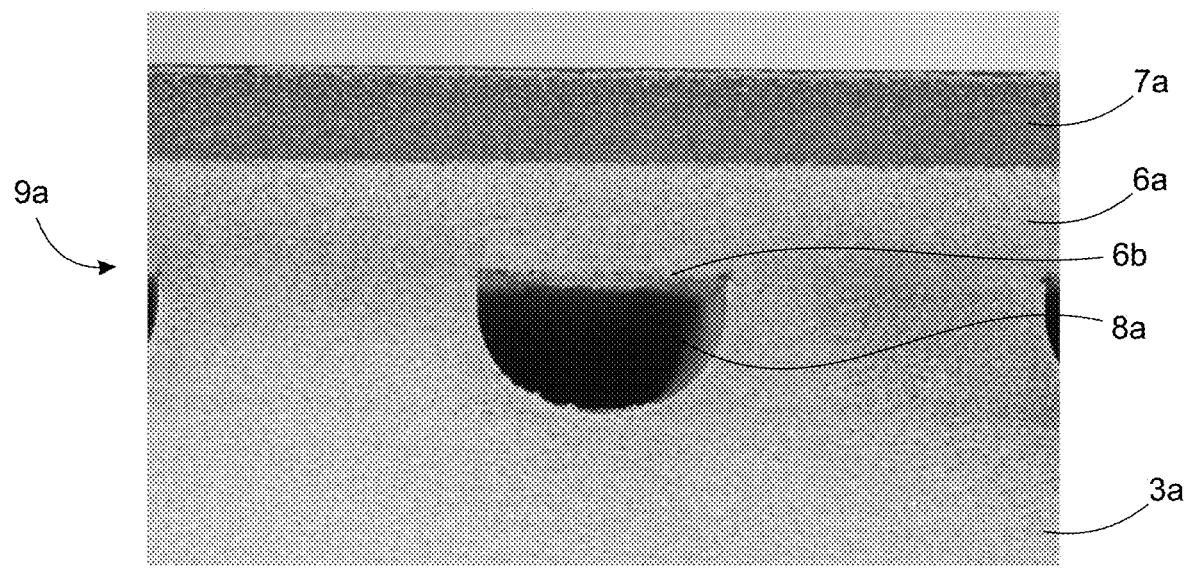
FIG. 2A is a photograph of a cross-section of a region of an Al6061 part having a channel of semi-circular cross-section formed therein by the process of FIG. 1, the channel bounded on one side by a layer of cold sprayed aluminum and the layer of cold sprayed aluminum covered by an overcoat of cold sprayed stainless steel.
Figure 2B:
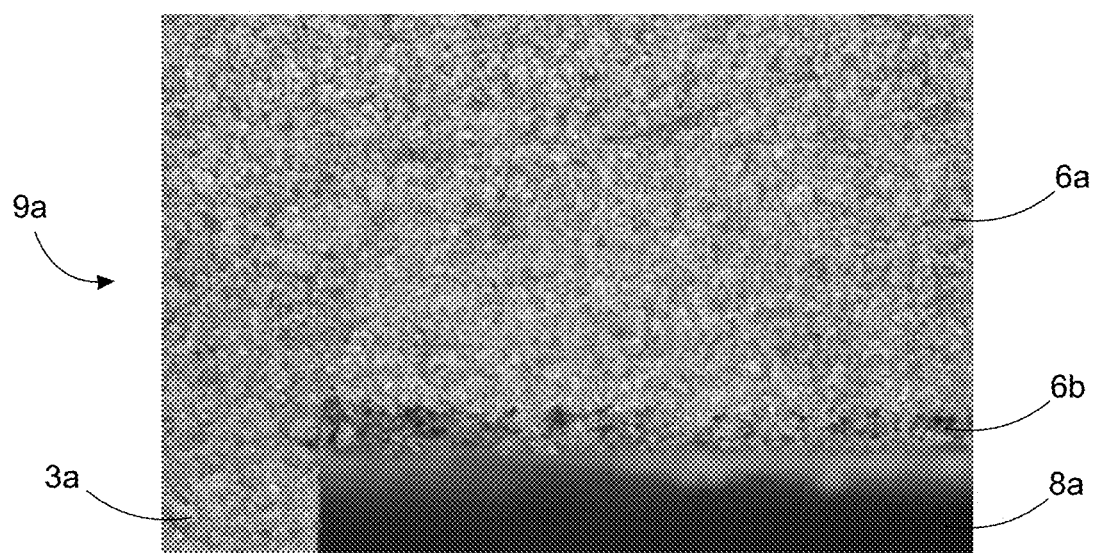
FIG. 2B is a magnification of FIG. 2A in a region around an interface between the layer of cold sprayed aluminum and the channel.

FIG. 2A is a photograph of a cross-section of a region of an Al6061 part 9a having a channel 8a of semi-circular cross-section formed therein by the process of FIG. 1. The channel 8a is bounded on the curved side by an Al6061 block 3a and on the flat top by a layer of cold sprayed aluminum 6a. A layer of cold sprayed stainless steel 7a covers the layer of cold sprayed aluminum 6a and the top of the Al6061 block 3a. The photograph shows that the layer of cold sprayed aluminum 6a, which was cold sprayed under low impact conditions, has a different microstructure than both the Al6061 block 3a and the cold sprayed stainless steel 7a. FIG. 2B is a magnified view of the interface between the layer of cold sprayed aluminum 6a and the channel 8a. FIG. 2B shows that a region 6b of the layer of cold sprayed aluminum 6a just above the channel 8a, which contained the sacrificial lead during the process, has an even different microstructure than the remainder of the cold sprayed aluminum 6a, and the region 6b has a different microstructure than would be manifest had the aluminum been sprayed under standard cold spray conditions. While the layer of cold sprayed aluminum 6a is less dense and more porous than the layer of cold sprayed stainless steel 7a and the Al6061 block 3a, the region 6b of the layer of cold sprayed aluminum 6a just above the channel 8a is even less dense and more porous than the remainder of the cold sprayed aluminum 6a.

Figure 3:
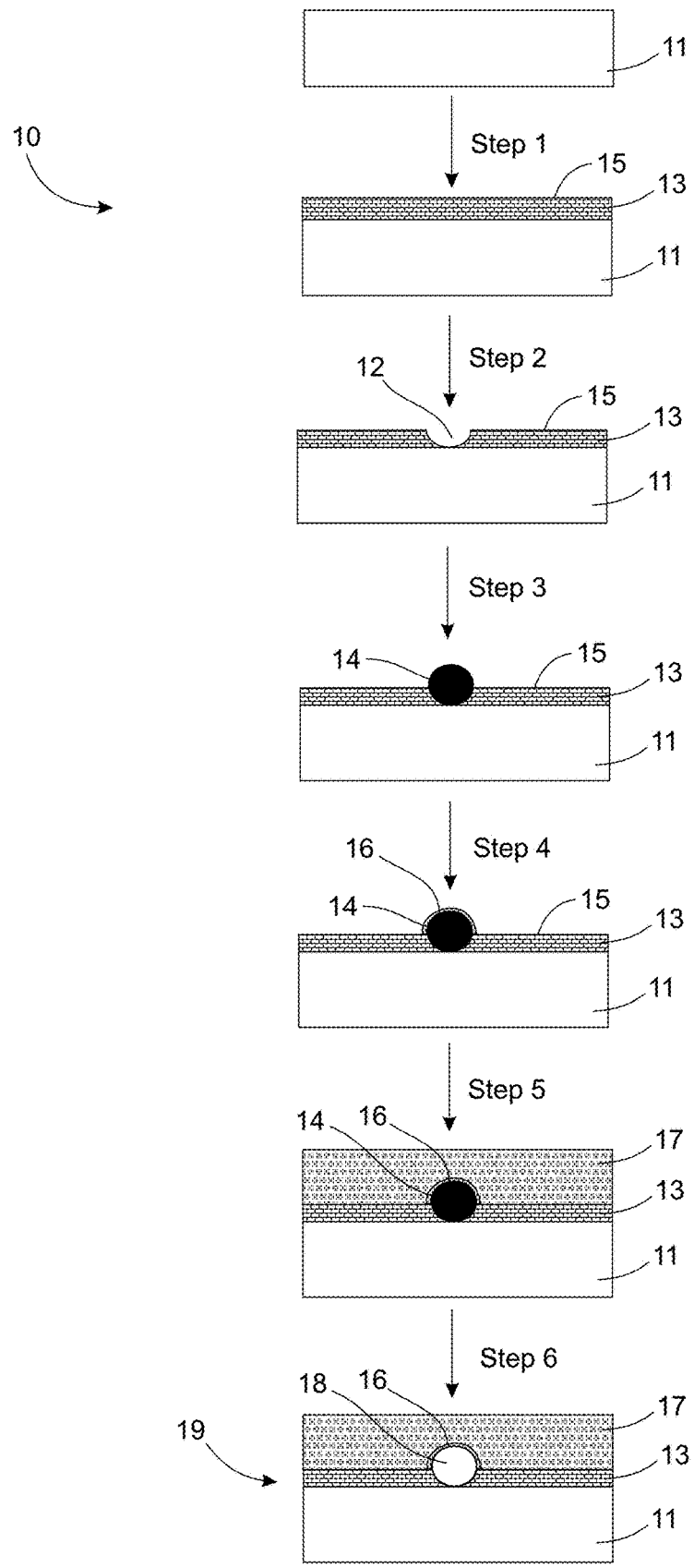
FIG. 3 is a schematic diagram illustrating a second embodiment of an additive manufacturing process of the present invention for forming a channel in a metal object.

FIG. 3 illustrates a second embodiment of an additive manufacturing process 10 for forming a channel 18 having a circular cross-section in an object 19. In Step 1, a base material 13 is cold sprayed under (high-impact) standard conditions on to a substrate 11. The substrate 11 may be a metal or a non-metal (e.g. a ceramic). In Step 2, a subsurface groove 12 is machined into the metal base material 13. As before, the groove can have any profile. As the base material 13 was cold sprayed, the groove 12 could alternatively have been produced by masking or avoiding deposition in accordance with standard additive manufacturing techniques to avoid the machining step. In Step 3, the groove 12 is filled with a fusible metal 14 having a melting point of 350° C. or less, the fusible metal 14 forming a structure with a circular cross-section that protrudes out of the groove 12 from a top surface 15 of the metal base material 13. In Step 4, a metal layering material 16 is cold sprayed under non-standard (low-impact) cold spray conditions over top of the fusible metal 14, the metal layering material 16 forming an arcuate cap over the fusible metal 14, bottom edges of the arcuate cap contacting the top surface 15 of the metal base material 13. In Step 5, a metal overcoat 17 is cold sprayed under standard (high-impact) cold spray conditions over top of the metal layering material 16 and over the top surface 15 of the metal base material 13. In Step 6, heat is applied to melt the fusible metal 14, which flows out under the influence of gravity or applied pressure to provide the channel 18 in the metal object 19.

While a variety of cold spray conditions have been discussed for improving adhesion to a sacrificial filler, variation of angle of incidence is one particularly useful technique if a top surface of the sacrificial filler is cambered (as shown in FIG. 3), rounded, or otherwise has a profile that varies transversely. As is well known in the art, cold spray deposition can be sensitive to angle of incidence. It can be critical for the spray jet to be oriented with respect to the surface at an angle within a narrow range. Some deposition conditions are more forgiving than others, and some coatings are even better at a relatively small angle off of normal, but more frequently it is observed that normal incidence provides a highest deposition efficiency, and favorable coating properties such as density. Particularly if a cambered or angled profile is provided for the sacrificial filler, a corresponding angle of deposition may be called for. Furthermore, it may be advantageous to flatten side edges of the sacrificial filler to minimize a variation in normal, on a scale of the cold spray jet, whenever the dimensions of the sacrificial filler are comparable to the spray jet. When the spray jet is substantially wider than the dimensions of the sacrificial filler, there is less to be gained by varying angle of incidence. Applicant's U.S. Pat. No. 9,168,546, the entire contents of which is herein incorporated by reference, teaches one technique for varying spray jet properties of cold spray nozzle. It should be noted that distinct advantages of varying angle of incidence, standoff, and traverse speed (speed at which the cold spray travels across the surface), as opposed to feedstock powders, powder preheat temperature, gas composition pressure and temperature, etc., include the ability to spray the layering material and then the overcoat, without stopping, and establishing a new steady state for the cold spray process, prior to deposition of the overcoat.

Figure 4:
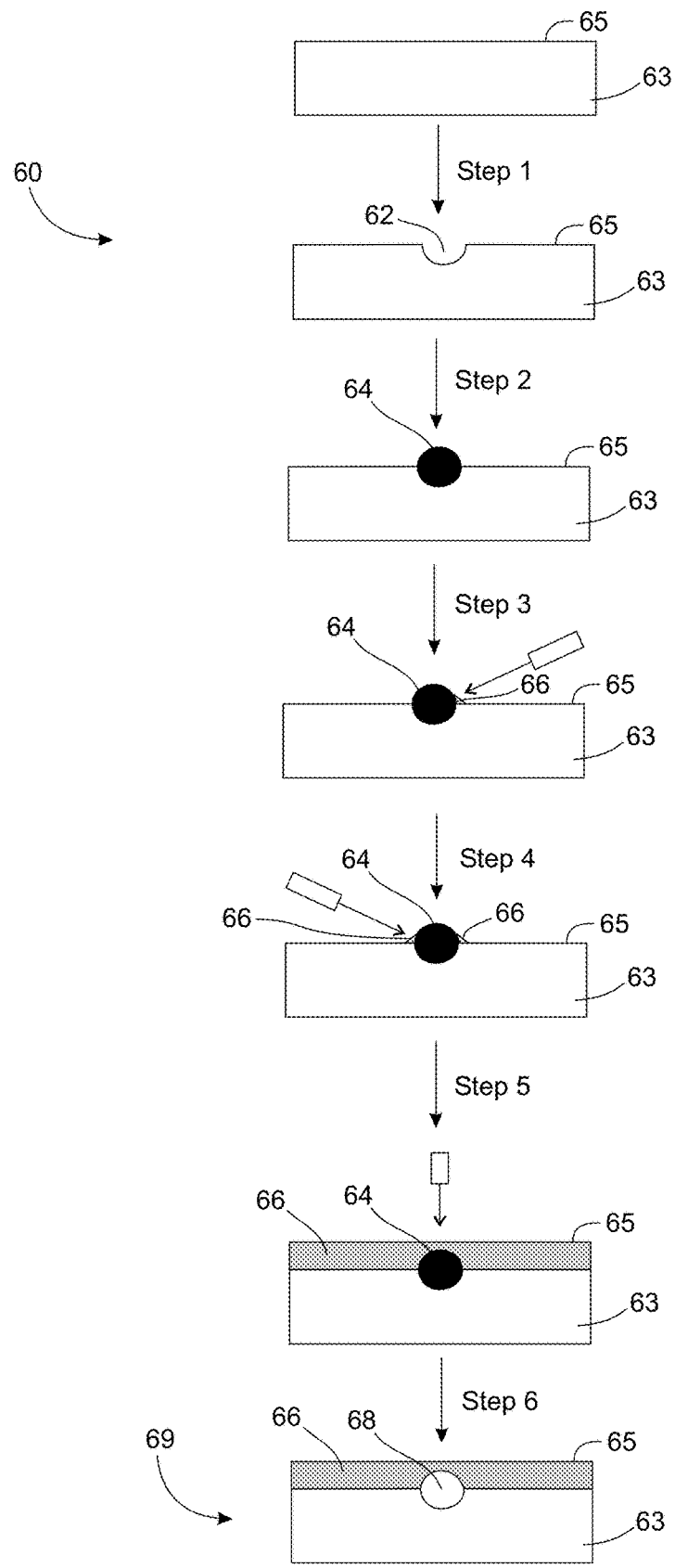
FIG. 4 is a schematic diagram illustrating a third embodiment of an additive manufacturing process of the present invention for forming a channel in a metal object.

FIG. 4 illustrates a third embodiment of an additive manufacturing process 60 for forming a channel 68 having a circular cross-section in an object 69. In Step 1, a subsurface groove 62 is machined into a block of base material 63, for example a block of Al6061 alloy. While the groove is illustrated as a highly rounded groove, any groove profile may alternatively be used, including a substantially square, or triangular shaped groove. In Step 2, the groove 62 is filled with a fusible metal 64 having a melting point of 350° C. or less, for example lead. The fusible metal 64 is introduced into the groove 62 as a tube of circular cross-section, therefore the fusible metal 64 extends above a top surface 65 of the block of base material 63. In Step 3, a metal layering material 66, for example aluminum, is cold sprayed under non-standard (low-impact) cold spray conditions at a 45° angle with respect to the top surface 65 of the base material 63 along one corner where the fusible metal 64, the base material 63 and the external atmosphere meet. In Step 4, the metal layering material 66 is cold sprayed under non-standard (low-impact) cold spray conditions at a 45° angle with respect to the top surface 65 of the base material 63 along the other corner where the fusible metal 64, the base material 63 and the external atmosphere meet. In Step 5, the metal layering material 66 is cold sprayed under non-standard (low-impact) cold spray conditions at a 90° angle with respect to the top surface 65 of the base material 63 to fully cover the fusible metal 64 with a layer of the metal layering material 66. In Step 6, heat is applied to melt the fusible metal 64, which flows out under the influence of gravity or applied pressure to provide the channel 68 in the object 69. Thus, an object is produced with a hollow structure defined by the extent of the fusible metal 64, that includes at least one end defined at an interface between the base material 63 and metal layering material 66. If desired, an overcoat layer may be cold sprayed under standard condition on top of the layer of metal layering material 66.

It will be appreciated that any method of producing in an object a surface that stabilizes the fusible metal may be used alternatively to the machining shown in FIG. 1, FIG. 3 and FIG. 4. For example, CSAM can be used to build up ridges or edges around a track for the fusible metal 4,14,64. Alternatively, no track need be provided for the fusible metal. If the fusible metal has a bottom surface closely matching the top surface 5,15,65 or is pressed into deformation with the top surface with minimal edge defined, the metal layering material 6,16 can be applied with low-impact cold spray conditions.

Figure 5A:
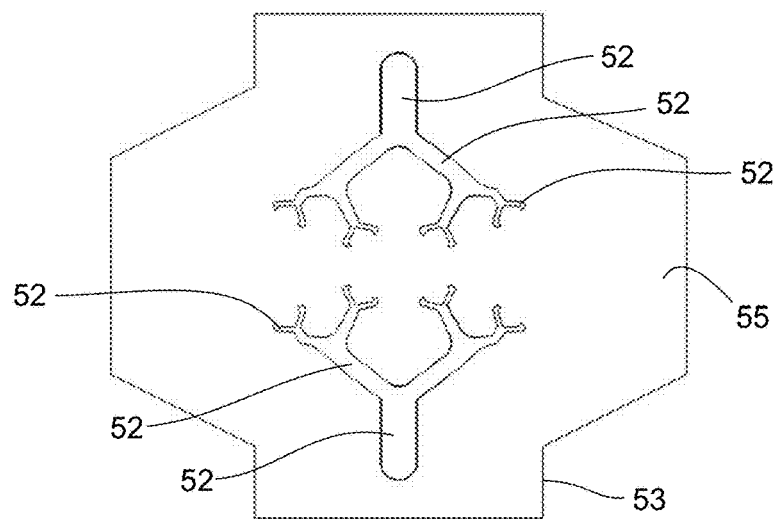
FIG. 5A, FIG. 5B and FIG. 5C together illustrate an additive manufacturing process of the present invention for forming a part having a thermal regulation zone.
Figure 5B:
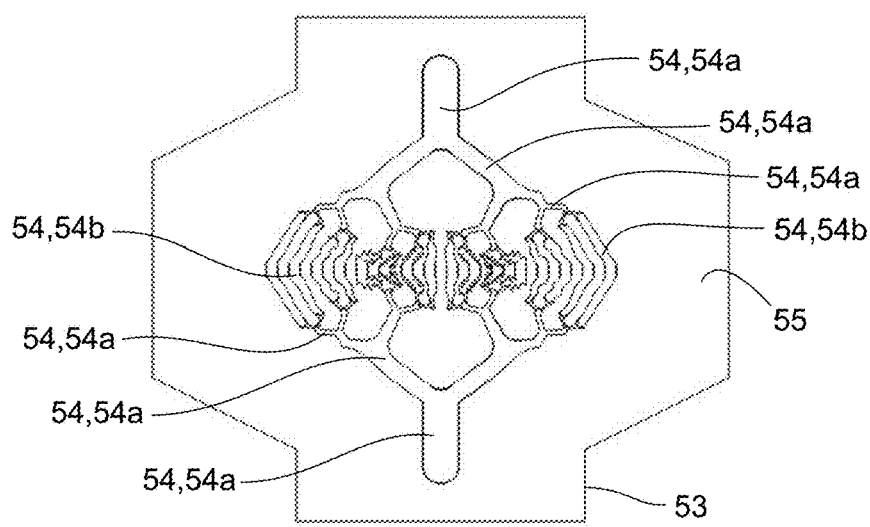
Figure 5C:
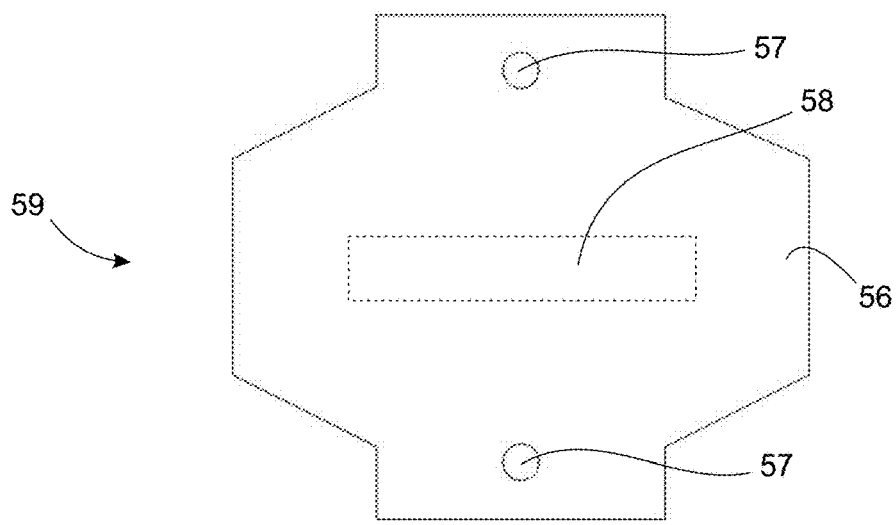

FIG. 5A, FIG. 5B and FIG. 5C illustrate in plan view, a process for forming a part 59 having a thermal regulation zone 58, as useful for forced gas or liquid (preferably gas such as air) heating or cooling of an object. FIG. 5A shows a set of grooves 52 on a top surface 55 of a base material 53, the set of grooves 52 defining a network of connected channels for supporting larger diameter parts of a branching network. This set of grooves 52 may be machined using the various machining techniques known in the art, or formed by additive manufacture, for example.

FIG. 5B shows a fusible metal 54 laid up on the top surface 55, with larger diameter tubular parts 54a thereof set within corresponding grooves 52 and finer tubular parts 54b lying flat on the top surface 55 between the grooves 52. At least the flat lying finer tubular parts 54b of the fusible metal 54 are preferably pressed into conformity with the top surface 55 to ensure a tight edge. Low-impact cold spray conditions are used to apply a metal layering material 56, and optionally one or more dense overcoat metal layers, to cover the fusible material 54 and remaining exposed top surface 55, except for openings 57. The fusible material 54 is melted and drained out of the hollow structure through the openings 57 to produce the part 59 as seen in FIG. 5C. The hollow structure thereby formed provides for binary division of the fluid into successively finer channels, an arrangement of parallel, uniformly distributed fine channels dispersed across a center of the thermal regulation zone 58, and a parallel structure for binary collection of the channels. This is a hollow structure commonly used in heat transfer. Two opposing ends of the hollow structure are provided with the openings 57 above and below the thermal regulation zone 58, in communication with the largest diameter channel segments. Preferably hydrodynamic resistance is equal across the fine channels. While equal spacing of the fine channels is shown, optimized designs for particular applications may not be equally spaced, have equal volume, or hydrodynamic resistances.

While a symmetric (butterflied) structure is shown lying across a single plane, it will be appreciated that three or more surfaces of a block can be patterned. For example, the binary division from input to fine channels can be provided symmetrically on two remote faces of a block, and the intermediate face may support the arrangement of parallel, uniformly distributed fine channels. Furthermore, the structure may be "folded" by applying two iterations of the method of the present invention. By first defining only the top half of the grooves in the top panel and applying the fusible metal filler in the top half, with wires of the fusible metal extending perpendicular to the top surface at ends thereof, and low impact cold spray condition deposition (optionally followed by standard CSAM) covering the layup, further addition of a second half of the set of grooves may be provided to complete the structure in two levels on a single surface of the object.

Cold Spray Experiments:

A series of experiments was conducted to determine conditions under which cold spray additive manufacturing (CSAM) can be successfully used to coat a metal layer on a low melting point filler material for the purpose of creating hollow structures in a base material.

Experiment 1

A 0.25" diameter, 0.125" deep round groove was machined into an Al6061 plate. The machined groove was filled manually with lead wire having a diameter of 0.25" resulting in half of the wire filling the groove and the other half extending above the surface of the Al6061 plate. The top half of the lead wire was machined to produce a flat surface and a good interface between the lead and the Al6061 plate. A coating of aluminum was cold sprayed onto both the Al6061 plate and the lead wire in the groove using Valimet™ H15 aluminum powder (standard powder) in combination with an Inovati™ KM-CDS 2.2 cold spray system, which is a low inlet gas pressure cold spray system. The gas inlet pressure was 0.83 MPa, the gas inlet temperature was 260° C. and the standoff distance was 10 mm. The aluminum successfully formed a cold sprayed layer on the lead under these conditions. The lead was then melted out at 350° C. for 1 hour to produce a covered subsurface channel in the Al6061 plate, the channel having a semicircular cross-section.

Experiment 2

The procedure described in Experiment 1 was duplicated except that Plasma Giken™ PMP-1010 copper powder was used instead of Valimet™ H15 aluminum powder to produce a copper coating over the Al6061 plate and the lead wire. In addition, the gas inlet pressure was 0.76 MPa, the gas inlet temperature was 482° C. and the standoff distance was 13 mm. The copper successfully formed a cold sprayed layer on the lead under these conditions.

Experiment 3

The procedure described in Experiment 1 was duplicated except that a Oerlikon Metco Kinetiks 4000 cold spray system was used, which is a high inlet gas pressure cold spray system. The gas inlet pressure was 3.5 MPa, the gas inlet temperature was 500° C. and the standoff distance was increased to 90 mm. The aluminum successfully formed a cold sprayed layer on the lead under these conditions.

Experiment 4

A 0.25" diameter, 0.125" deep round groove was machined into a mild steel plate. The machined groove was filled manually with lead wire having a diameter of 0.25" resulting in half of the wire filling the groove and the other half extending above the surface of the plate. The top half of the lead wire was machined to produce a flat surface and a good interface between the lead and the mild steel plate. A coating of aluminum was cold sprayed onto both the mild steel plate and the lead wire in the groove using Valimet™ H15 aluminum powder (standard powder) in combination with an Oerlikon Metco Kinetiks™ 4000 cold spray system, which is a high inlet gas pressure cold spray system. The gas inlet pressure was 3.5 MPa, the gas inlet temperature was 500° C. and the standoff distance was increased to 90 mm. The aluminum successfully formed a cold sprayed layer on the lead under these conditions. The lead was then melted out at 350° C. for 1 hour to produce a covered subsurface channel in the mild steel plate, the channel having a semicircular cross-section.

Experiment 5

A 0.25" diameter, 0.125" deep round groove was machined into a copper block. The machined groove was filled manually with lead wire having a diameter of 0.25" resulting in half of the wire filling the groove and the other half extending above the surface of the block. The top half of the lead wire was machined to produce a flat surface and a good interface between the lead and the copper block. A coating of H13 tool steel was cold sprayed onto both the copper block and the lead wire in the groove using Hooganaas™ pre-treated H13 tool steel powder in combination with a Plasma Giken™ PCS-1000 cold spray system. The Hoganas™ powder has an average particle size of 45 µm and the pre-treatment is a powder heat treatment resulting in considerable softening of the particles. The gas inlet pressure was 4.9 MPa, the gas inlet temperature was 950° C. and the standoff distance was 45 mm. The pre-treated H13 tool steel successfully formed a cold sprayed layer on the lead under these conditions. The lead was then melted out at 350° C. for 1 hour to produce a covered subsurface channel in the mild steel plate, the channel having a semicircular cross-section.

Experiment 6

A copper coating on top of a 0.0625" thick tin foil was cold sprayed using Centerline™ dendritic copper powder SST-05003 in combination with an Inovati™ KM-CDS 2.2 cold spray system, which is a low inlet gas pressure cold spray system. The gas inlet pressure was 0.97 MPa, the gas inlet temperature was 420° C. and the standoff distance was 10 mm. The copper successfully formed a cold sprayed layer on the tin under these conditions.

Experiment 7

A copper coating on top of a lead-free pewter alloy was cold sprayed using Centerline™ dendritic copper powder SST-05003 in combination with an Inovati™ KM-CDS 2.2 cold spray system, which is a low inlet gas pressure cold spray system. The gas inlet pressure was 0.97 MPa, the gas inlet temperature was 427° C. and the standoff distance was 10 mm. The copper successfully formed a cold sprayed layer on the lead-free pewter alloy under these conditions.

Experiment 8

The procedure described in Experiment 5 was duplicated except that a standard non-heat-treated Praxair™ Fe-101 stainless steel 316 powder was cold sprayed with an Oerlikon Metco Kinetiks™ 4000 cold spray system, which is a high inlet gas pressure cold spray system. Standard inlet gas pressure, inlet gas temperature and standoff distance were used. The gas inlet pressure was 4.0 MPa, the gas inlet temperature was 700° C. and the standoff distance was 80 mm. The standard stainless steel did not successfully form a cold sprayed layer on the lead under these standard cold spray conditions.

Experiment 9

The procedure described in Experiment 3 was duplicated except that a standard standoff distance in the range of 20-50 mm was used. Under these conditions, the lead was grit blasted or otherwise displaced from the groove, preventing the cold spray process from adequately building a coating that bridges the two sides of the groove.

Experiment 10

The procedure described in Experiment 6 was duplicated except that standard spherical Plasma Giken™ PMP-1010 copper powder was used. A coating of copper could not be built without destroying the tin foil under these standard conditions.

APPLICATION EXAMPLES

Conformal cooling in the mold-making industry is very desirable because conformal cooling may be able to reduce the injection mold cycle by up to 40%, resulting in significant cost reduction for producing plastic parts. Several methods are being used to manufacture conformal cooling channels in molds, for example vacuum brazing. However, there are limitations on the geometry and complexity of the mold to which such techniques can be applied.

Figure 6A:
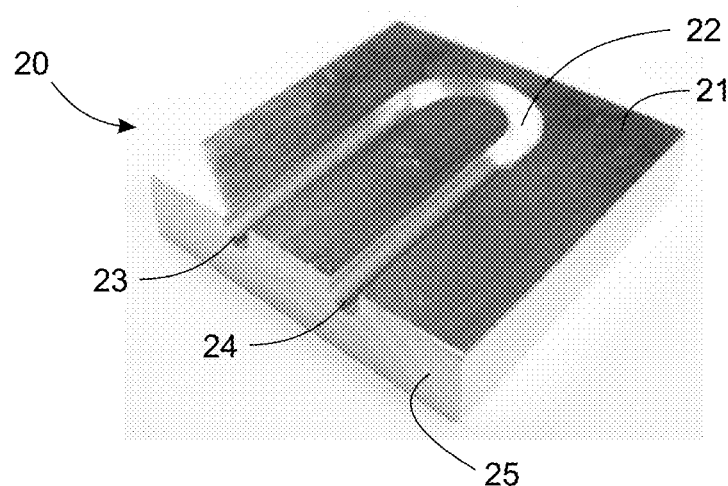
FIG. 6A depicts an Al6061 plate having a U-shaped groove machined therein between two apertures in a side of the plate.
Figure 6B:
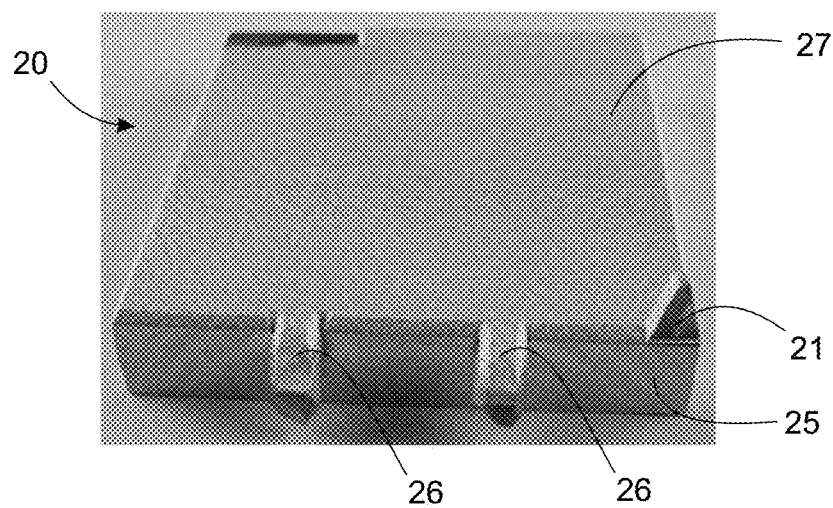
FIG. 6B depicts the Al6061 plate of FIG. 6A in which lead wire has been placed in the groove and the groove and lead wire therein covered by spray coating with a 2 mm thick first coating of aluminum.
Figure 6C:
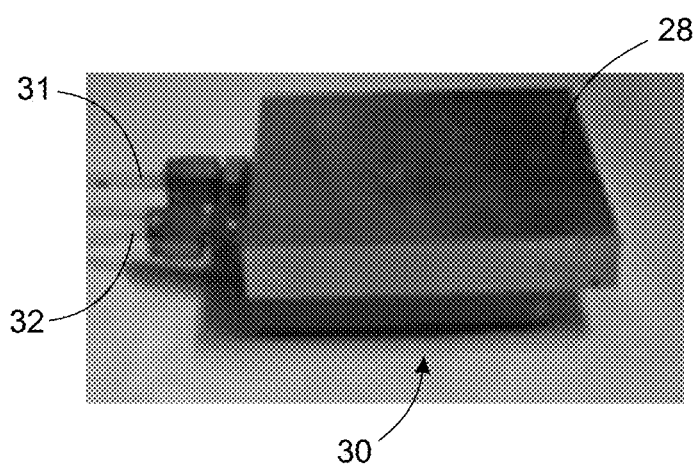
FIG. 6C depicts the Al6061 plate of FIG. 6B after depositing a second thicker coating of aluminum on the first coating of aluminum, after the lead was melted out of the channel and after water lines were attached to the two apertures in the side of the plate.
Figure 6D:
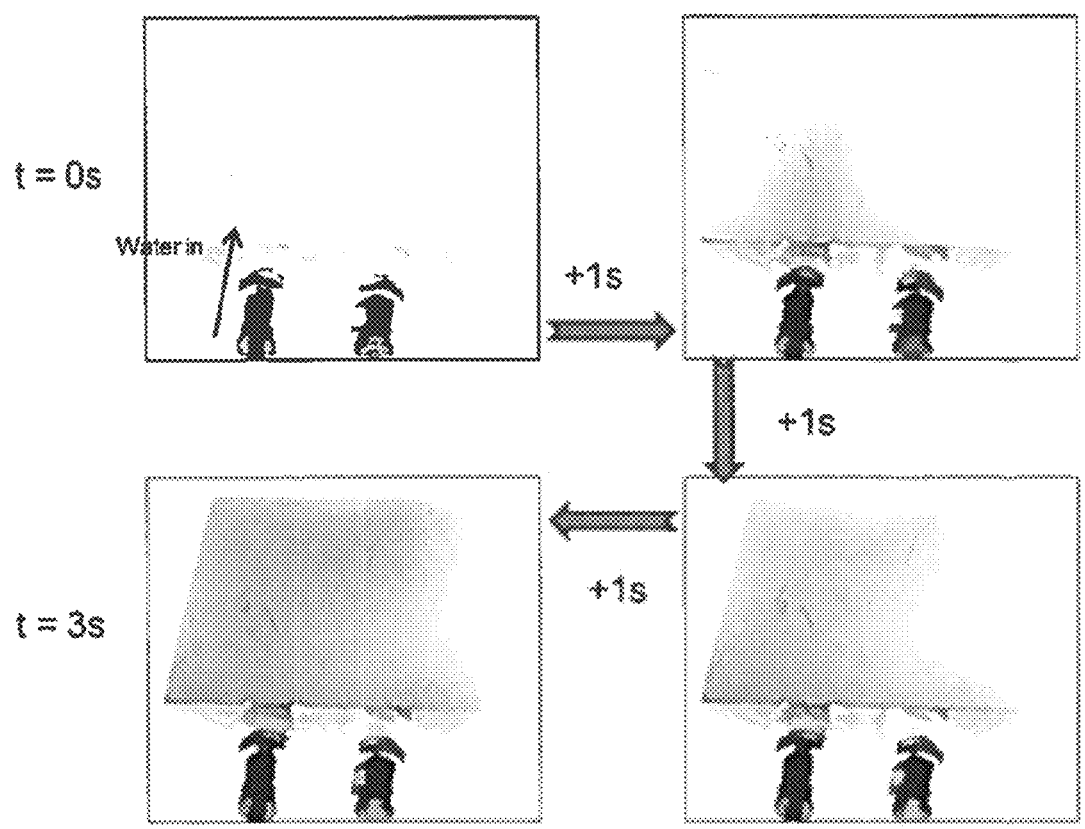
FIG. 6D depicts a series of thermal photographs over time of the Al6061 plate of FIG. 6C, in which water was circulated through the channel using the apertures in the side of the plate as water inlet and outlet ports.

With reference to FIG. 6A, FIG. 6B, FIG. 6C and FIG. 6D, to illustrate the potential for building conformal cooling channels in a mold using a cold spray additive manufacturing process in accordance with the present invention, a U-shaped groove 22 was machined into a top surface 21 of an aluminum alloy 6061 plate 20. The plate 20 was 3" long, 3" wide and 0.5" thick. The two ends of the U-shaped groove 22 terminated apertures 23, 24 in a side 25 of the plate 20. A 0.25" diameter lead wire 26 was inserted into the groove 22 and the top surface of the lead wire 26 was machined flat to present a uniform surface, without any visible crack between the lead wire 26 in the groove 22 and the plate 20. A 2 mm thick, first pure aluminum coating 27 was applied on top of both the plate 20 and the lead wire 26 using an Inovati™ KM-CDS 2.2 cold spray system, which is a low inlet gas pressure cold spray system. The gas inlet pressure was 0.83 MPa, the gas inlet temperature was 260° C. and the standoff distance was 10 mm. The result after cold spraying is shown in FIG. 6B. A second thicker coating of aluminum 28 was then deposited on top of the first coating of aluminum 27 using a high pressure cold spray system under standard conditions for a total aluminum coating thickness of 0.375". The coated plate 20 was heated to 350° C. in a furnace for 1 hour to melt the lead wire 26 out through the apertures 23, 24 to form a part 30 having a subsurface U-shaped channel therein. To confirm that the channel was open, water lines 31, 32 were connected to the channel through the apertures 23, 24, respectively, and colored water was circulated through the channel. To validate whether circulating water through the channel can cool the part 30, the part 30 was heated to 200° C. without water flowing through the channel. After temperature stabilization, water was circulated in the part 30 resulting in quickly cooling the part 30 to 30° C. within 3 seconds, as illustrated in FIG. 6D. In FIG. 6D, photographs of the part 30 were taken with a thermal camera at time intervals of t=0s, 1s, 2s, 3s.

Figure 7C:
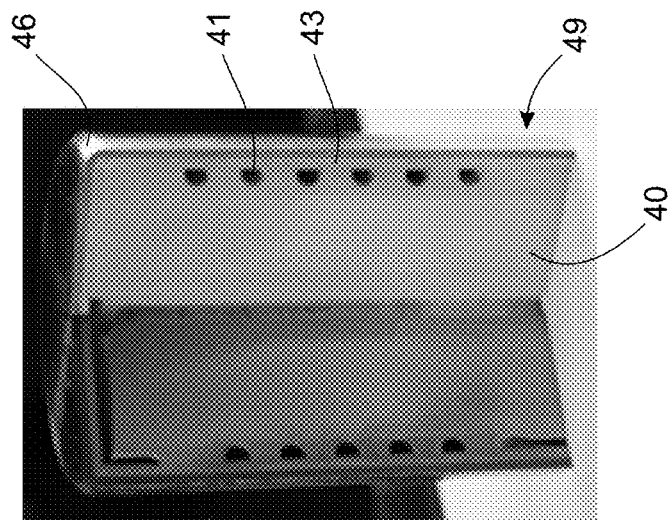
FIG. 7A depicts an Al6061 cylinder having a double helix channel machined therein that converges on a top face of the cylinder.
FIG. 7B depicts the Al6061 cylinder of FIG. 7A coated with a 2-3 mm layer of pure aluminum using a cold spray additive manufacturing process of the present invention; and, FIG. 7C depicts a cut-away of a multi-material insert having a core formed from the cylinder of FIG. 7A and having a subsurface double helical channel formed under the cold sprayed layer of aluminum of FIG. 7B.
Figure 7B:
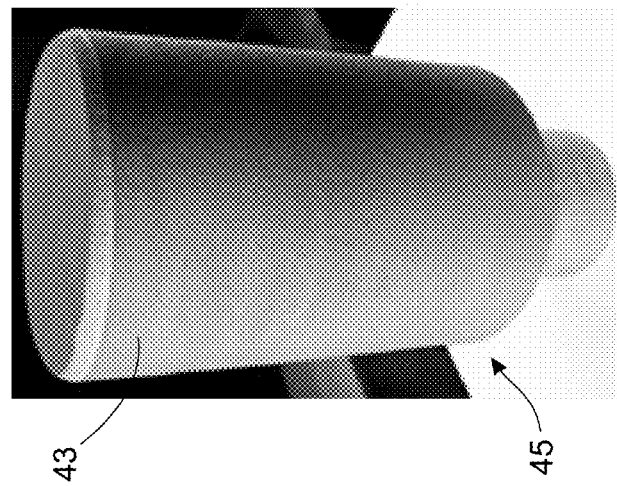
Figure 7A:
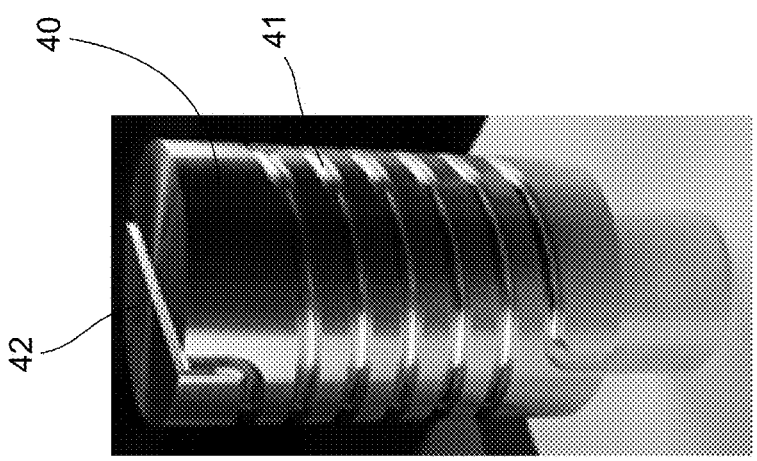

FIG. 7A, FIG. 7B and FIG. 7C, further illustrate the potential for building conformal cooling channels in a more complex multi-material insert 49 using a cold spray additive manufacturing process of the present invention. An Al6061 cylinder 40, 4.5" long and 3" in diameter, was machined with a double helix channel 41 that converges on a top face 42 as seen in FIG. 7A. The channel 41 was filled manually with lead wire and the top surface of the lead wire was machined to ensure that the lead wire was flush with the surface of the cylinder without gaps between the lead wire and the edges of the channel 41. A 2-3 mm pure aluminum coating 43 was cold sprayed on to the cylinder 40 and lead wire with a high-pressure Oerlikon Metco Kinetiks™ 4000 cold spray system using an increased standoff distance of 90 mm to produce an aluminum coated cylinder 45 as shown in FIG. 7B. The aluminum coated cylinder 45 was heated to 350° C. for 3 hours in a furnace to melt the lead, which flowed out the bottom of the channel 41 thereby freeing the channel 41. A 3-4 mm stainless steel 316 overcoat 46 was cold sprayed on top of the aluminum coating 43 with the high-pressure Oerlikon Metco Kinetiks™ 4000 cold spray system using a standard standoff distance. The stainless steel overcoat 46 was then milled and the insert 49 was wire-cut so that the internal structure of the insert 49 could be seen, as shown in FIG. 7C.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An additively manufactured object comprising:
   a base material;
   a volume of a fusible metal having a melting point of 350° C. or less on the base material and bounded in part by the base material; and,
   a cold sprayed layer of a metal layering material coating a portion of the base material, the metal layering material bounding a portion of the fusible metal, the metal layering material having a higher porosity than the base material, a lower hardness than the base material, a higher degree of plastic deformation than the base material or any combination thereof.

2. The object of claim 1, further comprising a cold sprayed metal overcoat layer covering the metal layering material in a region where the metal layering material bounds the portion of the fusible metal, the metal overcoat layer having a lower porosity than the metal layering material, a higher degree of plastic deformation than the metal layering material, a higher hardness than the metal layering material or any combination thereof.

3. The object of claim 1, wherein the volume comprises a plurality of junctions that connect two or more narrow diameter sections with one wider diameter section.

4. The object of claim 1, wherein the fusible metal has a tensile strength in a range of from 15 MPa to 250 MPa, a Modulus of elasticity in a range of from 10 GPa to 50 GPa and a Brinell hardness in a range of from 2 to 4.5.

5. The object of claim 1, wherein the melting point of the fusible metal is in a range of from 170° C. to 330° C.

6. The object of claim 1, wherein the fusible metal is lead, a lead alloy, tin or a tin alloy.

7. The object of claim 1, wherein the volume of fusible metal comprises one or more connected tubular forms.

8. The object of claim 7 wherein for at least some of the tubular forms, viewed in cross-section, the part of the fusible metal bounded by the metal layering material has a length on the order of 0.4-0.25 inch.

9. A method of forming a hollow structure in an additively manufactured object, the method comprising removing the fusible metal from the additively manufactured object of claim 2 by melting the fusible metal without melting or deforming the base material or the metal layering material, to leave a hollow structure in the object.

10. The method of claim 9, wherein removing the fusible metal comprises heating the object to a temperature below 500° C. and allowing the molten fusible metal to drain from an opening of the hollow structure, the opening being defined at one of: an interface between the metal layering material and the base material; a hole in the metal layering material; or a hole through the surface of the base material.

11. A composition comprising a metal base material, a fusible metal having a melting point of 350° C. or less arranged on the base material in a shape and a cold sprayed layer of metal layering material covering the fusible metal, the cold sprayed metal layering material having a microstructure consistent with cold spray deposition conducted under non-standard lower pressure cold spray conditions in comparison to standard cold spray conditions for depositing the metal layering material on the metal base material, the non-standard lower pressure cold spray conditions comprises one or more of: an inlet carrier gas pressure of lower than 2 MPa, an inlet gas temperature of 300° C. or less; and a standoff distance of at least 60 mm.

12. The composition of claim 11, wherein the metal layering material has a higher porosity than the base material, a lower hardness than the base material, a higher degree of plastic deformation than the base material or any combination thereof.

13. The composition of claim 11, further comprising a cold-sprayed metal overcoat layer covering the layer of metal layering material and at least a portion of the base material.

14. The composition of claim 13, wherein the metal overcoat layer has a lower porosity than the layer of metal layering material, a higher degree of plastic deformation than the layer of metal layering material, a higher hardness than the layer of metal layering material or any combination thereof.

15. The composition of claim 11, wherein the fusible metal has a tensile strength in a range of from 15 MPa to 250 MPa, a Modulus of elasticity in a range of from 10 GPa to 50 GPa and a Brinell hardness in a range of from 2 to 4.5.

16. The composition of claim 11, wherein the melting point of the fusible metal is in a range of from 170° C. to 330° C.

17. The composition of claim 11, wherein the fusible metal is lead, a lead alloy, tin or a tin alloy.

18. The composition of claim 11, wherein the volume of fusible metal comprises one or more connected tubular forms.

19. The composition of claim 18 wherein for at least some of the tubular forms, viewed in cross-section, the part of the fusible metal bounded by the metal layering material has a length on the order of 0.4-0.25 inch.

* * * * *